United States Patent [19]

Brown

[11] Patent Number: 5,146,686
[45] Date of Patent: Sep. 15, 1992

[54] VARIABLE CENTERLINE SIGHT

[76] Inventor: Sam J. Brown, R.R. 3, Box 38, Cozad, Nebr. 69130

[21] Appl. No.: 766,014

[22] Filed: Sep. 26, 1991

[51] Int. Cl.⁵ .................................... G01C 5/02
[52] U.S. Cl. ........................ 33/264; 33/286; 172/430
[58] Field of Search ............... 33/370, 264, 286, 288, 33/227; 172/430

[56] References Cited

U.S. PATENT DOCUMENTS

| | | | |
|---|---|---|---|
| 1,378,852 | 4/1921 | Allen . | |
| 2,198,864 | 4/1940 | Degrelle | 97/233 |
| 2,538,112 | 1/1951 | Maier | 33/46 |
| 2,548,226 | 4/1951 | Maier | 33/46 |
| 2,555,954 | 6/1951 | Bruflat | 33/46 |
| 2,559,761 | 7/1951 | Fulton | 33/46 |
| 2,565,615 | 8/1951 | McCoy | 33/370 |
| 2,669,787 | 2/1954 | Wetzig, Sr. | 33/370 |
| 2,771,043 | 7/1952 | Carlson | 111/1 |
| 2,827,704 | 4/1954 | Hunsicker | 33/46 |
| 2,925,656 | 2/1960 | Genovese | 33/46 |
| 3,234,671 | 2/1966 | Reynolds et al. | 37/148 |
| 3,611,286 | 10/1971 | Cleveland | 172/430 |
| 3,678,885 | 7/1972 | Ferguson | 33/370 |
| 3,900,073 | 8/1975 | Crum | 172/430 |
| 4,280,281 | 7/1981 | Gerber | 33/264 |
| 4,363,174 | 12/1982 | Curtis | 33/264 |
| 4,393,596 | 7/1983 | Gerber | 33/264 |
| 4,401,166 | 8/1983 | Brown | 172/430 |
| 4,511,005 | 4/1985 | Brown | 172/430 |
| 4,919,214 | 4/1990 | Brown | 172/430 |

Primary Examiner—Thomas B. Will
Attorney, Agent, or Firm—Zarley, McKee, Thomte, Voorhees & Sease

[57] ABSTRACT

A centerline sight apparatus includes a housing mounted on the forward end of a tractor with a sight arm operably mounted in the housing for transverse movement with respect to the longitudinal axis of the tractor. A second sight arm is operably mounted below the first sight arm and moves parallel to the first sight arm at a speed approximately twice as fast and in the same direction as the first sight arm. Both sight arms are connected to a motor which is responsive to movement of a pendulum, so as to move the sight arms in one direction of the other. The pendulum is mounted to sense the lateral cant of the tractor with respect to the tractor's longitudinal axis.

4 Claims, 3 Drawing Sheets

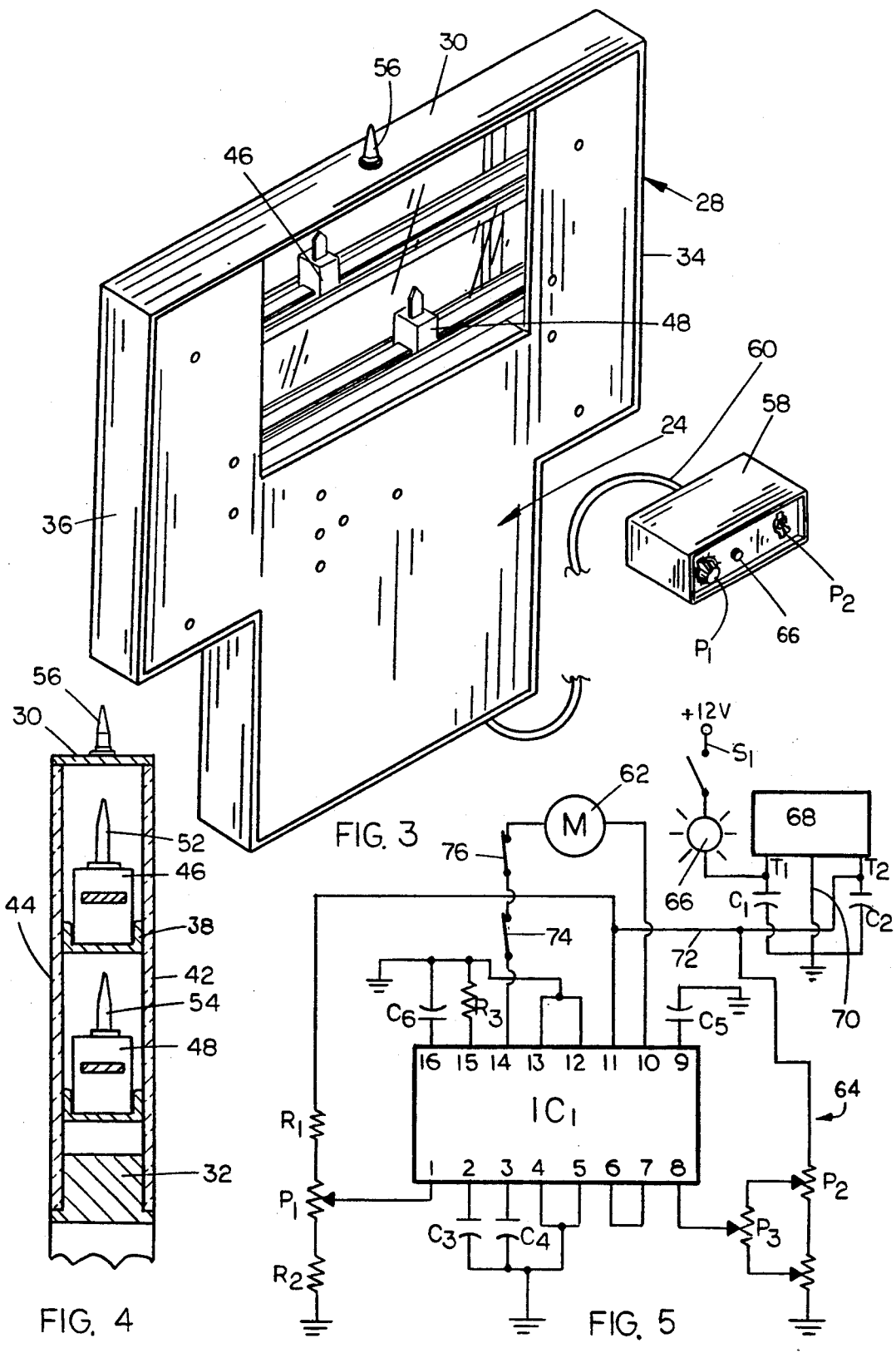

VARIABLE CENTERLINE SIGHT

TECHNICAL FIELD

The present invention is directed generally to a row follower guidance apparatus for a tractor, and more particularly to a laterally variable centerline sight.

BACKGROUND OF THE INVENTION

In the past, a tractor operator generally used the center crease in the hood of the tractor as the sight for maintaining the tractor in its properly centered position relative to crop rows. It has been found however, that there is a significant variation in the positioning of a tractor by different operators, because some people are right eye dominated and others are left eye dominated. The dominant eye is that which is used for establishing a single line of sight. Most operators align the tractor hood crease or ornament with the guide furrow for centering the tractor, but the lines of sight of a left eye dominated operator and a right eye dominated operator will result in substantially different positions of the tractor relative to the furrow.

To resolve this problem, the present inventor developed the furrow follower vision correction system described in U.S. Pat. No. 4,401,166. That system includes a laterally adjustable tractor sighting device which can be adjusted by various operators to accommodate their particular positioning on the tractor seat and dominate eye. Thus, by simple lateral adjustment of the sighting device, all operators can easily maintain a uniform and centered position of the tractor relative to planted rows or crops or any other visible centerline.

Whereas the device of U.S. Pat. No. 4,401,166 is believed to be a significant advance in the art, a problem is encountered with the use of this device on hilly terrain. Even on hills, the sighting device is affected only slightly, if at all, by the tractor driving directly up or down a sloping surface. The problem occurs when the tractor drives transversely across the side of a hill whereupon the wheels on one side of the tractor are elevated above the wheels on the opposite side of the tractor. This canting of the tractor toward the downhill direction causes the operator's line of sight through the laterally adjusted sighting device to be offset from the centerline being followed by the tractor.

To resolve this problem, the present inventor developed the centerline sight with reverse pendulum described in U.S. Pat. No. 4,511,005. That device includes an upstanding pivotally mounted sight with a depending pivotally mounted pendulum interconnected such that the pendulum will pivot as the tractor tilts which will thereby move the sighting device.

While the device of U.S. Pat. No. 4,511,005 solved many problems specifically related to tractors which are constantly canted to one side or the other, another problem arises when the tractor is driven neither directly up or down a sloping surface nor around a hill at a constant canted angle. Rather, the ground surfaces typically will cause the tractor to assume a position traveling uphill or downhill while also being canted to one side or the other. In addition, soil conditions will cause the tractor to slide slightly as it moves along in this uphill or downhill canted position. This problem is believed to be resolved by the centerline sight of the present invention.

Accordingly, a primary object of the present invention is to provide an improved centerline sight for a tractor.

Another object is to provide a centerline sight for a tractor which is laterally adjustable to compensate for the various driving positions and dominant eyes of the various operators.

A further object of the present invention is to provide a laterally adjustably centerline sight which is equipped to maintain a proper line of sight when the tractor is laterally canted and longitudinally tilted.

Another object is to provide a centerline sight which is variable to adjust for different sizes and types of tractors as well as different types of soil.

Yet another object is to provide a laterally adjustable centerline sight which is simple and rugged in construction, inexpensive to manufacture, and efficient in operation.

These and other objects will be apparent to those skilled in the art.

SUMMARY OF THE INVENTION

The centerline sight apparatus of the present invention includes a housing mounted on the forward end of a tractor with a sight arm operably mounted in the housing for transverse movement with respect to the longitudinal axis of the tractor. A second sight arm is operably mounted below the first sight arm and moves parallel to the first sight arm at a speed approximately twice as fast and in the same direction as the first sight arm. Both sight arms are connected to a motor which is responsive to movement of a pendulum, so as to move the sight arms in one direction of the other. The pendulum is mounted to sense the lateral cant of the tractor with respect to the tractor's longitudinal axis. The sight arms are set to move at different speeds because of the difference in adjustment necessary which correcting the align of sight while traveling up hill as compared with the correction necessary when traveling down hill.

BRIEF DESCRIPTION OF THE DRAWINGS

FIG. 3 is a perspective view of the tractor guidance apparatus of this invention;

FIG. 4 is a partial vertical section taken through the upper portion of the device shown in FIG. 3;

FIG. 5 is an electrical schematic of the circuitry for the invention; and

DESCRIPTION OF THE PREFERRED EMBODIMENT

Figure 1:
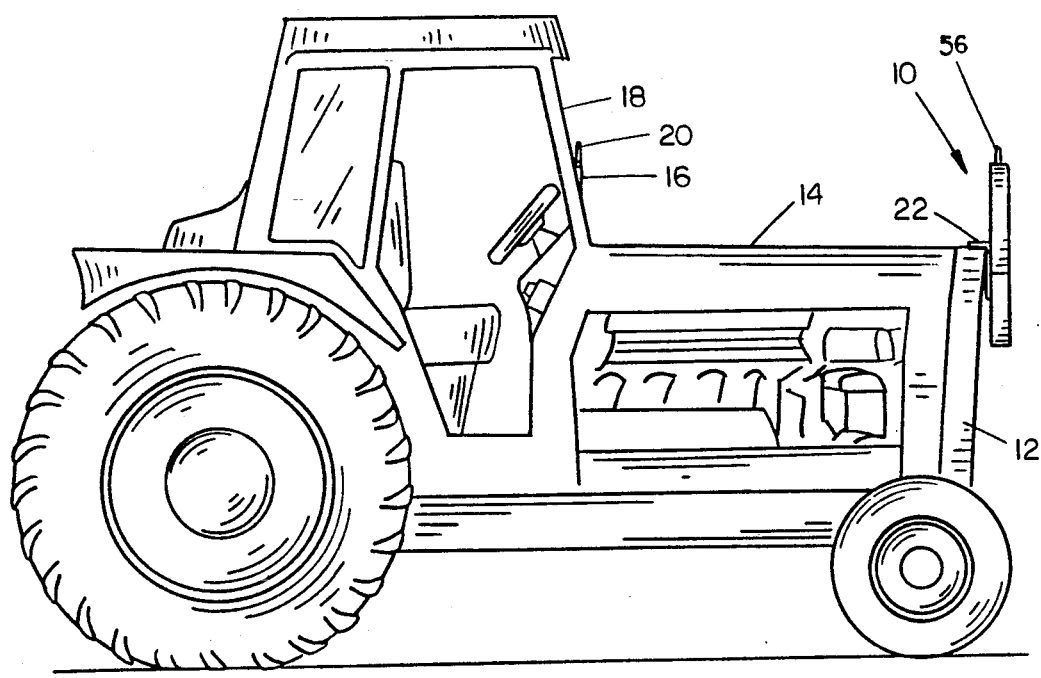
FIG. 1 is a side elevational view of the centerline sight mounted on a tractor.

Referring now to the drawings, in which similar or corresponding parts are identified with the same reference numeral, and more particularly to FIG. 1, the tractor guidance apparatus of the present invention is designated generally at 10 and is mounted on the forward end 12 of a tractor 14. A windshield sight 16 is mounted on the windshield 18 of the tractor 14 and includes an upwardly projecting sight needle 20. As shown in FIG. 1, tractor guidance apparatus 10 is mounted to forward end 12 of tractor 14 with a bracket 22, so as to be securely fixed thereto.

Figure 2:
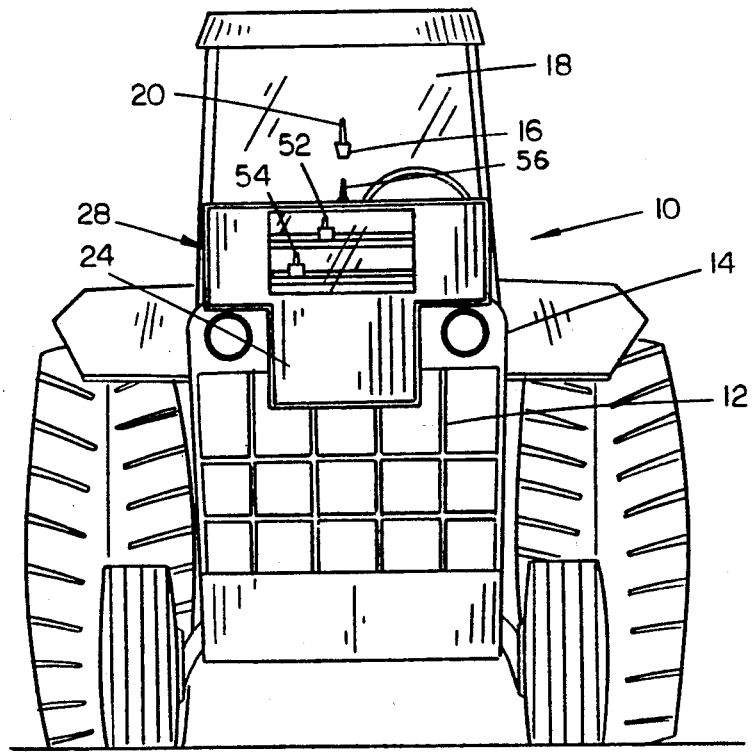
FIG. 2 is a front elevational view of the centerline sight mounted on a tractor.

Referring now to FIGS. 2 and 3, tractor guidance apparatus 10 includes a lower housing 24 which encases a lateral-cant sensing apparatus 26, such as the reverse pendulum device of the inventor's prior U.S. Pat. No. 4,511,005, which is incorporated herein by reference.

Figure 6:
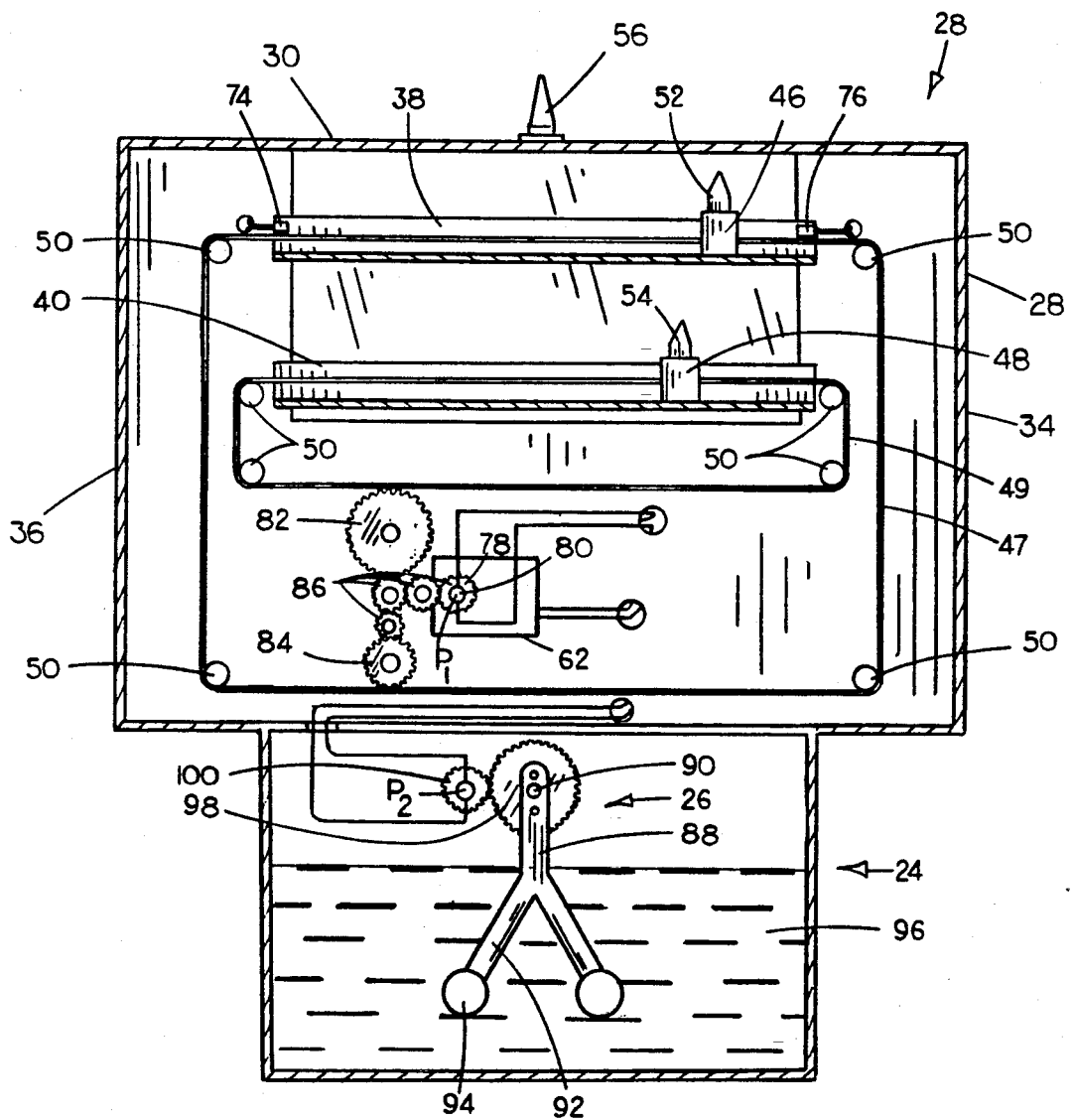
FIG. 6 is a front view of the device, with the front cover removed.

An upper housing 28 is mounted on lower housing 24 and includes a rectangular frame having an upper horizontal member 30, lower horizontal member 32 and right and left sides 34 and 36 respectively. As shown in FIGS. 4 and 6, an upper elongated channel 38 extends between right and left sides 34 and 36 and is spaced above a lower elongated channel 40, and parallel thereto. Clear front and rearward panels 42 and 44 respectively are mounted on the rectangular frame so as to encase channels 38 and 40. A block 46 is mounted on a first belt 47 and mounted for slidable movement along upper channel 38. A second block 48 is mounted on a second belt 49 and mounted for slidable movement along lower channel 40. Belts 47 and 49 are closed loops which are operably mounted around pulleys 50 to cause blocks 46 and 48 to move longitudinally along channels 38 and 40, laterally with respect to upper housing 28.

Each block 46 and 48 has a sight needle 52 and 54 mounted thereon respectively, for purposes to be described in more detail hereinbelow. A sight needle 56 is also mounted on the top of housing 28 for guidance of the tractor, as described below.

A control box 58 (see FIG. 3) is electrically connected via electrical cable 60 to the lateral-cant sensing apparatus 26 and a motor 62 for driving belts 47 and 49. FIG. 5 shows the electronic schematic for the circuit within control box 58. Circuit 64 is connected through an on/off switch S1 to a 12 volt power supply on the tractor. An indictor light 66 is connected in series with the power supply to a voltage regulator 68. Voltage regulator 68 is grounded through lead 70 and has its two terminals T1 and T2 connected to lead 70 through capacitors C1 and C2 respectively.

A lead 72 extends from terminal T2 to pin 11 on a DC servo motor controller/driver integrated circuit, which is also grounded through resistor R1 potentiometer P1 and resistor R2, in series. The control for potentiometer P1 is connected to pin 1 of the integrated circuit IC1. Lead 72 is also grounded through a dual throw potentiometer P2 with the dual terminals of potentiometer P2 connected to potentiometer P3 and thence to pin 8 of IC1. Pins 2 and 3 of IC1 are grounded through capacitors C3 and C4 respectively. Pins 4 and 5 are grounded directly. Pins 6 and 7 are connected together, and pin 9 is grounded through capacitor C5. Pins 12 and 13 are grounded directly; pin 15 is grounded through resistor R3; and pin 16 is grounded through capacitor C6. Motor 62 is connected in series between pins 14 and 10, with a pair of normally closed limit switches 74 and 76 placed in series between pin 14 and motor 62.

Referring now to FIG. 6, it can be seen that motor 62 is mounted in upper housing 28 and has a rotatable gear 78 mounted on drive shaft 80. Motor gear 78 drives a first large drive gear 82 and a second smaller drive gear 84 through a series of idler 86. Large drive gear 82 is in operable contact with belt 49 so as to drive belt 49 on pulleys 50. Similarly, drive gear 84 is in operable contact with belt 47 to drive belt 47 on pulleys 50. It should be noted that drive gears 82 and 84 contact belts 49 and 47 respectively so as to move blocks 46 and 48 in the same direction upon activation of motor 62. However, drive gear 84 is smaller than drive gear 82 such that belt 47 is driven faster and a greater distance than belt 49.

Potentiometer P1 is connected to drive shaft 80 on motor 62 and serves to indicate the reference position of the motor to integrated circuit IC1. Limit switches 74 and 76 are mounted in a conventional fashion to channel 38 and will be operated by movement of block 46 at one end or the other of channel 38.

The lateral-cant sensing apparatus 26 includes a pendulum arm 88 pivotally mounted on a pin 90 within lower housing 24. Pendulum arm 88 extends downwardly and divides into a pair of legs 92 having weights 94 at the ends thereof. Legs 92 extend downwardly within a fluid 96 which fills the lower portion of lower housing 24, to assist in dampening the motion of the pendulum arm 88. A pendulum gear 98 is connected to pendulum arm 88 and mounted on pin 90 so as to rotate in one direction or the other upon pivotal movement of pendulum arm 88. Pendulum gear 98 drives a smaller gear 100 with a potentiometer P2 mounted thereon. As shown in schematic diagram, potentiometer P2 will drive motor 62 in one direction or the other relative to the position of pendulum arm 88.

In operation, once the guidance apparatus 10 is installed on a tractor, it can be adjusted for a particular operator by situating the tractor on level ground and then laterally adjusting sight needles 52 and 54 utilized potentiometer P2 (see FIGS. 3 and 5). To do this, the operator climbs onto the operator seat and adjusts the sight needles 52 and 54 to a position so that the upper end of sight needles 52 and 54 intersect a line of sight from the operator's dominant eye through windshield sight needle 20 to a ground furrow or other centerline over which the tractor is situated. At the same time, sight needle 56 will also be aligned with sight needles 20, 52 and 54.

As the tractor proceeds across a field, the operator can easily maintain the tractor in its desired centered position over the ground centerline by maintaining a constant position in the tractor seat and steering the tractor to align sight needle 20 with sight needles 52 or 54 with the ground centerline. On uneven terrain, the tractor is laterally canted so that the ground wheels on one side are lower than the ground wheels on the other side. In addition, the tractor is typically tilted going uphill or downhill. The lateral-cant sensing apparatus 26 will sense the lateral cant of the tractor over such uneven terrain, and cause needles 52 and 54 to shift laterally. The transverse movement of sight needles 52 and 54 compensate for the effect of the tilting tractor. As the operator steers to maintain sight needles 52 or 54 in alignment with windshield sight 20 and the ground centerline, the tractor remains properly situated between the crop rows even while traversing the side of the hill. At the same time, the operator keeps his head in a position to maintain sight needles 20 and 56 in alignment, as a reference position.

It is has been found that when the tractor moves up a hill, the operator must make a corrective move much more quickly than when the tractor moves to a downhill position. For this reason, the upper sight needle 52 moves laterally at a speed twice as fast as lower sight needle 54. Once the tractor arrives at the crest of a hill, the operator should then sight along windshield sight 20 and lower sight needle 54 to maintain the appropriate guidance along the designated centerline.

Whereas the invention has been shown and described in connection with the preferred embodiment thereof, it will be understood that many modifications, substitutions, and additions may be made which are within the intended broad scope of the appended claims. There has therefore been shown and described an improved tractor guidance system which accomplishes at least all of the above stated objects.

I claim:

1. In combination:

a tractor having forward and rearward ends, an operator's seat, a longitudinal axis, and a first reference sight mounted forwardly of the operator's seat to sight along a furrow;

an apparatus for centering said tractor along a predetermined course, comprising:

a housing mounted on the forward end of said tractor;

a second reference sight mounted on said housing for reference alignment with respect to the first reference sight;

a sight arm operably mounted to said housing for transverse movement with respect to the longitudinal axis of the tractor;

motor means in said housing operably connected to said sight arm for selectively moving said sight arm in one transverse direction or the other;

means for sensing lateral cant of said tractor with respect to its longitudinal axis, operably connected to said motor means to operate the motor upon sensing a lateral cant in a first direction and to reverse the motor upon sensing a lateral cant in the opposite direction;

said sensing means operably connected to said motor means to move said sight arm a distance proportional to the amount of lateral cant sensed.

2. The combination of claim 1, further comprising:

a second sight arm operably mounted to said housing for transverse movement parallel to said first sight arm; and said motor means operably connected to said second sight arm for selectively moving said second sight arm in one transverse direction or the other simultaneous with said first sight arm.

3. The combination of claim 2, wherein said operable connection of the motor means with said first and second sight arms includes means for moving said second sight arm in the same direction as said first sight arm and at a velocity faster than said first sight arm.

4. The combination of claim 1, wherein said sensing means includes a pendulum pivotally mounted on an axis parallel to the longitudinal axis of the tractor.

* * * * *